(12) United States Patent
Lagana

(10) Patent No.: US 7,001,029 B1
(45) Date of Patent: Feb. 21, 2006

(54) REARVIEW MIRROR ASSEMBLY

(76) Inventor: Ida Famiglietti Lagana, 13 Underway Dr., Westbrook, CT (US) 06498

( * ) Notice: Subject to any disclaimer, the term of this patent is extended or adjusted under 35 U.S.C. 154(b) by 0 days.

(21) Appl. No.: 11/040,436

(22) Filed: Jan. 21, 2005

(51) Int. Cl.
*G02B 5/08* (2006.01)
*G02B 17/00* (2006.01)

(52) U.S. Cl. .................................. 359/602; 296/97.8

(58) Field of Classification Search .............. 359/601, 359/602, 614, 844; 296/97.1, 97.4, 97.5, 296/97.8, 97.9, 97.12, 97.13
See application file for complete search history.

(56) References Cited

U.S. PATENT DOCUMENTS

| | | | |
|---|---|---|---|
| D45,379 S | 3/1914 | Hammond | |
| 1,376,377 A | 4/1921 | Mee | |
| 1,518,956 A | 12/1924 | Beitman | |
| 1,687,572 A | 10/1928 | Hodny | |
| 2,573,812 A | 11/1951 | Schroeder | |
| 3,411,841 A | 11/1968 | Loftin | |
| 3,494,689 A | 2/1970 | McGlinchy | |
| 3,525,563 A | 8/1970 | Loftin | |
| 3,825,296 A * | 7/1974 | Peterson | ................. 296/97.13 |
| 3,957,357 A | 5/1976 | Kulikowski | |
| 4,133,405 A | 1/1979 | Turek | |
| 4,248,474 A | 2/1981 | Mandrick | |
| 4,674,849 A | 6/1987 | Stewart | |
| 4,718,756 A | 1/1988 | Lancaster | |
| 4,824,161 A * | 4/1989 | Lee | .......................... 296/97.8 |
| 4,895,435 A | 1/1990 | Shomper | |
| 4,929,014 A * | 5/1990 | Clark et al. | ................ 296/97.8 |
| 5,054,900 A | 10/1991 | Simson | |
| 5,113,292 A | 5/1992 | Simson | |
| 5,127,700 A | 7/1992 | Joe et al. | |
| 5,472,255 A | 12/1995 | Moore | |
| 5,751,488 A * | 5/1998 | Wade | ......................... 359/601 |
| D418,788 S | 1/2000 | Iacovelli et al. | |
| 6,776,446 B1 * | 8/2004 | Tutt | ......................... 296/97.11 |
| 2003/0142425 A1 | 7/2003 | Bustos | |
| 2004/0090688 A1 | 5/2004 | Mostrom | |

\* cited by examiner

*Primary Examiner*—Mark A. Robinson
(74) *Attorney, Agent, or Firm*—McCormick, Paulding & Huber LLP

(57) ABSTRACT

A rearview mirror assembly includes first and second sections each adapted to extend over about one half a length of a vehicle windshield. The first and second sections each include a housing, a mirror disposed in the housing, and a pull-down visor disposed in the housing behind the mirror when in a stored position. Each pull-down visor includes a plurality of generally telescopically coupled panels for adjustably setting a length of the visor.

14 Claims, 2 Drawing Sheets

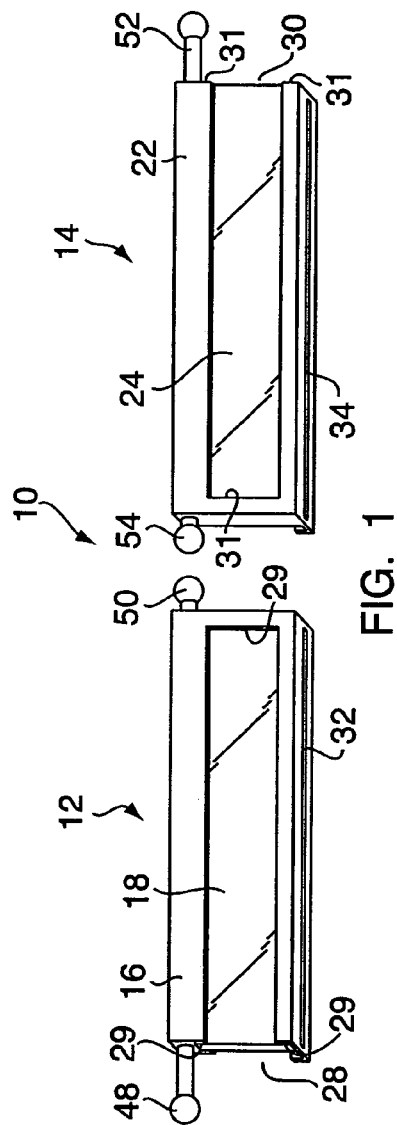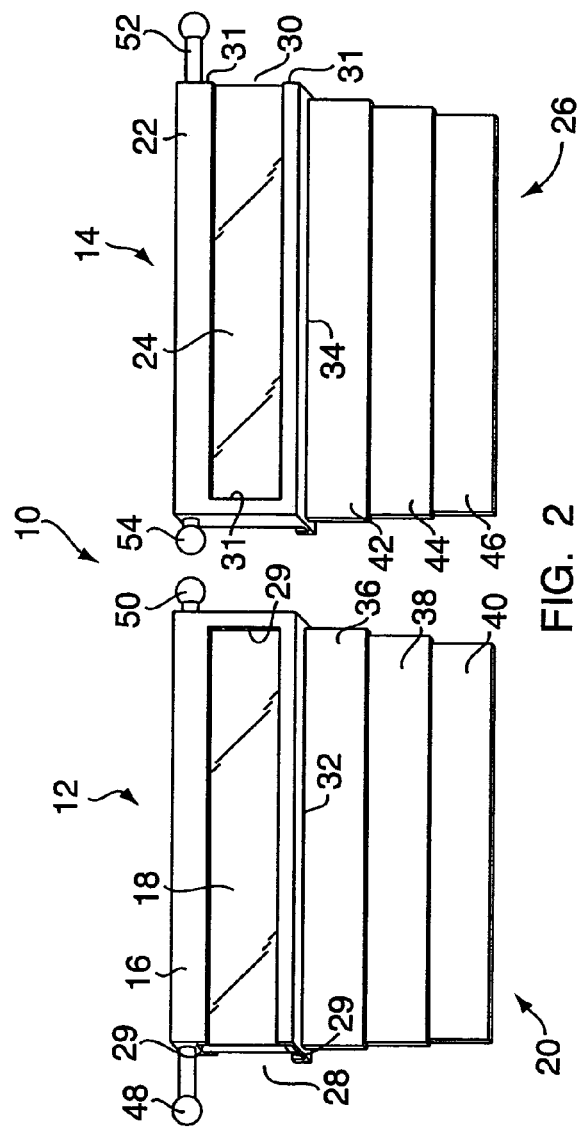

REARVIEW MIRROR ASSEMBLY

FIELD OF THE INVENTION

The present invention is generally directed to a rearview mirror, and more particularly relates to a panoramic rearview mirror assembly for a vehicle.

BACKGROUND OF THE INVENTION

Vehicles typically come equipped with a rearview mirror that is small relative to the length of a windshield. Such rearview mirrors are located in an upper central portion of the windshield. The relatively short length of rearview mirrors creates a relatively narrow field of vision reflected in the mirrors. As a result, drivers are forced to shift their glance away from the windshield and toward the side windows or side view mirrors in order to supplement the field of vision. Unfortunately, taking one's glance away from the forward view through the windshield, however briefly, increases the risk of accidents.

Based on the foregoing, it is an object of the present invention to provide a rearview mirror assembly that avoids the above-mentioned drawbacks and disadvantages associated with prior rearview mirrors.

SUMMARY OF THE INVENTION

A rearview mirror assembly embodying the present invention includes first and second sections each adapted to extend over about one half a length of a vehicle windshield. The first and second sections each include a housing, a mirror disposed in the housing, and a pull-down visor disposed in the housing behind the mirror when in a stored position. Each pull-down visor includes a plurality of telescopically coupled panels for adjustably setting a length of the visor.

BRIEF DESCRIPTION OF THE DRAWINGS

FIG. 1 is a perspective view of a rearview mirror assembly embodying the present invention.

FIG. 2 is a perspective view of the rearview mirror assembly of FIG. 1 showing pull-down visors in an operative position.

DETAILED DESCRIPTION OF THE PREFERRED EMBODIMENT

Figure 3A:
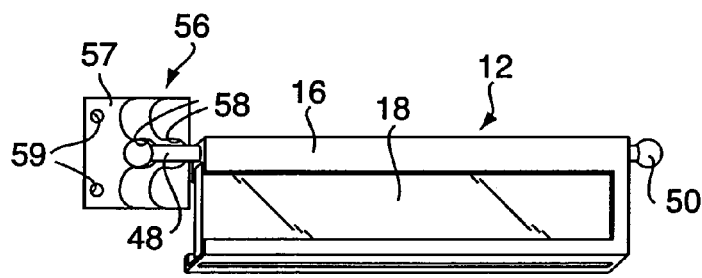
FIG. 3A is a perspective view of a section of the rearview mirror assembly including a side fastener assembly in accordance with the present invention.

With reference to FIGS. 1 and 2, a rearview mirror assembly embodying the present invention is generally indicated by the reference number 10. The assembly 10 comprises a first section 12 and a second section 14. The first and second sections 12, 14 are each adapted to extend over about one half a length of a vehicle windshield. More specifically, the first section 12 is adapted to extend over the left side of a windshield as seen within the vehicle. Similarly, the second section 14 is adapted to extend over the right side of a windshield as seen within the vehicle. The first and second sections 12, 14 can be fabricated in several various lengths so that the sections can be selected to accommodate the length of a particular windshield.

The first section 12 includes a first housing 16, a first mirror 18 to be disposed within the first housing, and a first pull-down visor 20 to be disposed in the first housing behind the first mirror when in a stored position. Similarly, the second section 14 includes a second housing 22, a second mirror 24 to be disposed within the second housing, and a second pull-down visor 26 to be disposed in the second housing behind the second mirror when in a stored position. The first and second mirrors 18, 24 can be fabricated from glass, or more preferably fabricated from a lightweight material such as plasti-glass. Moreover, the front surfaces of the first and second mirrors 18, 24 are preferably generally planar so as to avoid distortion of the rearview provided by the mirrors which would otherwise occur if the mirrors had curvature.

The housings 16, 22 are each preferably fabricated from a lightweight plastic or other material and each includes an opening on one side for receiving and securing an associated mirror therein. Preferably, the housings 16, 22 are each about three inches wide and about one inch thick, but can take other practical dimensions. As shown in FIG. 1, the first housing 16 defines an opening 28 on a left side thereof from a driver's perspective for receiving the first mirror 18. The first housing 16 includes rims or lips 29 bordering three sides along a front portion thereof for retaining the first mirror 18. Similarly, the second housing 22 defines an opening 30 on a right side thereof from a driver's perspective for receiving the second mirror 24. The second housing 22 includes rims or lips 31 bordering three sides along a front portion thereof for retaining the second mirror 24. Moreover, the first housing 16 defines a longitudinal opening or slot 32 on a bottom portion thereof to permit the first pull-down visor 20 to be pulled out of the first housing into an operative position and to be returned to and stored within the first housing when not in use. Similarly, the second housing 22 defines a longitudinal opening or slot 34 on a bottom portion thereof to permit the second pull-down visor 26 to be pulled out of the second housing into an operative position and to be returned to and stored within the second housing when not in use.

As shown in FIG. 2, the first pull-down visor 20 includes first, second and third generally telescopically coupled panels 36, 38, 40, respectively. The panels 36, 38, 40 are made from an opaque and generally rigid material such as a lightweight plastic so as to prevent the panels from flapping, bending or otherwise moving when a vehicle is in motion. By way of example, the first panel 36 is pulled downwardly away from the first housing 16 in order to shield a driver's eyes from the sun or other glare coming through a windshield. Should the length of the first pull-down visor 20 need to be increased to accommodate a driver's size or the particular direction of glare through a windshield, the second panel 38 is pulled downwardly away from the first panel 36. Moreover, should the length of the first pull-down visor 20 need to be further increased, the third panel 40 is pulled downwardly away from the second panel 38.

Similarly, the second pull-down visor 26 includes first, second and third generally telescopically coupled panels 42, 44, 46, respectively. The panels 42, 44, 46 are made from an opaque and generally rigid material. By way of example, the first panel 42 is pulled downwardly away from the second housing 22 in order to shield a driver's or passenger's eyes from the sun or other glare coming through a windshield. Should the length of the second pull-down visor 26 need to be increased, the second panel 44 is pulled downwardly away from the first panel 42. Moreover, should the length of the second pull-down visor 26 need to be further increased, the third panel 46 is pulled downwardly away from the second panel 44. As can be seen from FIG. 2, the first and second pull-down visors 20, 26 are independently adjustable. Although the first and second pull-down visors 20, 26 are each shown and described as having three panels, it should be understood that the pull-down visors can have a fewer or greater number of panels without departing from the scope of the present invention.

As shown in FIGS. 1 and 2, the first section 12 includes first and second projections 48, 50 extending laterally away from sides of the first housing 16 in opposite directions relative to each other for reasons to be explained below. Likewise, the second section 14 includes first and second projections 52, 54 extending laterally away from sides of the second housing 22 in opposite directions relative to each other.

Figure 3B:
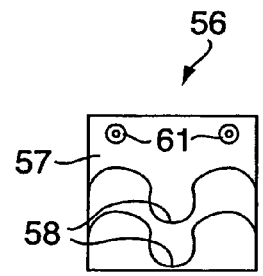
FIG. 3B is an enlarged view of the side fastener assembly of FIG. 3A.

With reference to FIGS. 3A and 3B, the first projection 48 of the first section 12 is adapted to engage a side fastener assembly 56 to be secured to a side of a vehicle. Specifically, the side fastener assembly 56 includes a mounting plate 57 defining two holes 59 for receiving fasteners 61 such as screws to secure the side fastener assembly to a side of a vehicle. Preferably, the side fastener assembly 56 includes a plurality of spring-loaded sockets 58 for rotatably engaging the first projection 48 of the first section 12. Similarly, the first projection 52 of the second section 14 is adapted to engage another side fastener assembly 56 (not shown) to be secured to the other side of a vehicle.

Figure 4A:
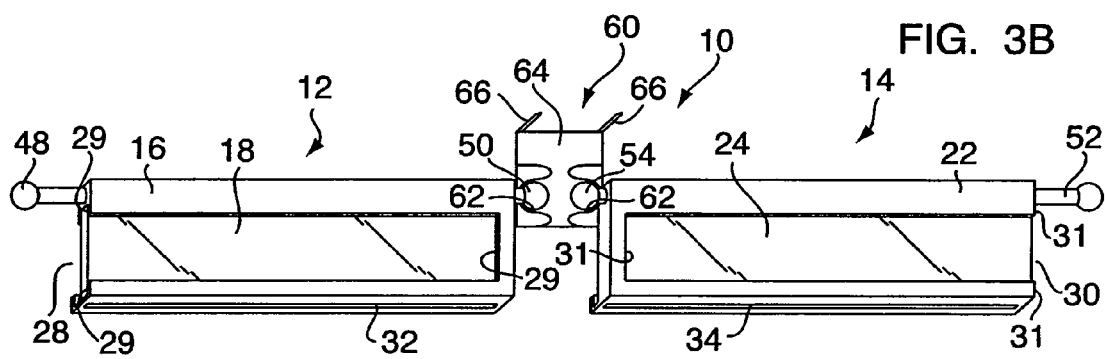
FIG. 4A is a perspective view of sections of a rearview mirror assembly coupled to each other via a center fastener assembly in accordance with the present invention.
Figure 4B:
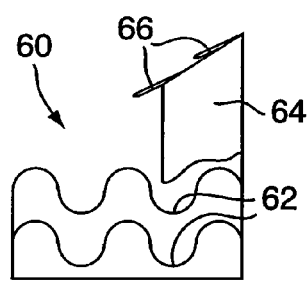
FIG. 4B is an enlarged view of the center fastener assembly of FIG. 4A.

With reference to FIGS. 4A and 4B, the second projection 50 of the first section 12 is adapted to engage a center fastener assembly 60 to be secured to a rooftop of a vehicle. Specifically, the center fastener assembly 60 includes a mounting plate 64 including hooks 66 for mounting the center fastener assembly to a rooftop of a vehicle. Preferably, the center fastener assembly 60 includes a plurality of spring-loaded sockets 62 for rotatably engaging the second projection 50 of the first section 12. Similarly, the second projection 54 of the second section 14 is adapted to engage the center fastener assembly 60 such that the first and second sections 12, 14 are coupled to each other via the center fastener assembly in side-by-side relationship. As shown in FIG. 2, the length of the first projections 48, 52 are preferably longer than the length of the second projections 50, 54. The additional length of the first projections 48, 52 permits the first projections to reach the side fastener assemblies 56 secured on the side of a vehicle.

In operation, the first and second sections 12, 14 are placed side-by-side across an interior upper portion of a vehicle windshield. The space between adjacent sides of the first and second sections 12, 14 should be minimal such as, for example, about one inch. The first and second sections 12, 14 are selected so that the lengths of the sections when placed side-by-side generally cover the length of a windshield. The first and second mirrors 18, 24 provide a panoramic view, and more specifically create a wide rear view of about 180 degrees. Moreover, the first and second mirrors 18, 24 cooperate to eliminate the typical blind spots on the sides of a vehicle to enable a driver to always be looking forward through a windshield while driving.

The first projection 48 of the first section 12 rotatably engages an associated side fastener assembly 56, and the second projection 50 of the first section rotatably engages the center fastener assembly 60 to permit the first housing 16 to be pivoted in either direction along a longitudinal axis in order to adjust the orientation of the first mirror 18 to accommodate the view of a driver. Similarly, the first projection 52 of the second section 14 rotatably engages an associated side fastener assembly 56, and the second projection 54 of the second section rotatably engages the center fastener assembly 60 to permit the second housing 22 to be pivoted in either direction along a longitudinal axis in order to adjust the orientation of the second mirror 24 to accommodate the view of the driver. Because the first section 12 and the second section 14 are separate units, the first mirror 18 and the second mirror 24 are independently adjustable in orientation.

A driver uses the first pull-down visor 20 by, for example, pulling the first panel 36 downwardly through the first slot 32 so that the first panel is exposed beneath the first housing 16. Should a driver desire to extend the length of the first pull-down visor 20, the second panel 38 is pulled downwardly from the first panel 36 so that the first and second panels 36, 38 are exposed beneath the first housing 16. Should a driver desire to further extend the length of the first pull-down visor 20, the third panel 40 is pulled downwardly from the second panel 38 so that the first, second and third panels 36, 38, 40 are exposed beneath the first housing 16.

Alternatively, a driver can use the first pull-down visor 20 by pulling the third panel 40 downwardly through the first slot 32 so that the third panel is exposed beneath the first housing 16. Should a driver desire to extend the length of the first pull-down visor 20, the second panel 38 is pulled downwardly through the first slot 32 so that the second and third panels 38, 40 are exposed beneath the first housing 16. Should a driver desire to further extend the length of the first pull-down visor 20, the first panel 36 is pulled downwardly through the first slot 32 so that the first, second and third panels 36, 38, 40 are exposed beneath the first housing 16.

A driver or passenger uses the second pull-down visor 26 in the same way as explained above with respect to the first pull-down visor 20. Because the first section 12 and the second section 14 are separate units, the first pull-down visor 20 and the second pull-down visor 26 are independently adjustable. In order to shorten or store the pull-down visors 20, 26, the above-mentioned steps for lengthening the pull-down visors are reversed.

While the present invention has been described in a preferred embodiment, it will be understood that numerous modifications and substitutions can be made without departing from the spirit of the invention. Accordingly, the present invention has been described in a preferred embodiment by way of illustration, rather than limitation.

What is claimed is:

1. A rearview mirror assembly comprising:
   first and second sections each adapted to extend over about one half a length of a vehicle windshield; and
   the first and second sections each including a housing, a mirror disposed in the housing, and a pull-down visor disposed in the housing behind the mirror when in a stored position, the pull-down visor including a plurality of generally telescopically coupled panels for adjustably setting a length of the visor.

2. A rearview mirror assembly as defined in claim 1, wherein each pull-down visor includes three generally telescopically coupled panels.

3. A rearview mirror assembly as defined in claim 1, further comprising a center fastener assembly for coupling the first and second sections to each other in side-by-side relationship.

4. A rearview assembly as defined in claim 3, wherein the center fastener assembly includes a bracket having a plurality of spring-loaded sockets.

5. A rearview mirror assembly as defined in claim 4, wherein the housings each include a projection for rotatably engaging the center fastener assembly such that the housings are independently adjustably pivotable in orientation.

6. A rearview mirror assembly as defined in claim 3, wherein the center fastener assembly includes at least one hook for fastening to a rooftop.

7. A rearview mirror assembly as defined in claim 1, further comprising two side fastener assemblies for coupling the first and second sections to a side of a vehicle.

8. A rearview mirror assembly as defined in claim 7, wherein the side fastener assemblies each include a bracket having a plurality of spring-loaded sockets.

9. A rearview mirror assembly as defined in claim 7, wherein the side fastener assemblies each include a mounting plate defining at least one hole for receiving a fastener therethrough for mounting a side of an associated section to a side of a vehicle.

10. A rearview mirror assembly as defined in claim 7, wherein the housings each include a projection for rotatably engaging an associated side fastener assembly such that the housings are independently adjustably pivotable in orientation.

11. A rearview mirror assembly as defined in claim 1, wherein each mirror is smoked to minimize glare.

12. A rearview mirror assembly as defined in claim 1, wherein each mirror includes one of glass and plasti-glass.

13. A rearview mirror assembly as defined in claim 1, wherein each mirror has a generally planar front surface.

14. A rearview assembly as defined in claim 1, wherein the panels are fabricated from a generally rigid material.

\* \* \* \* \*

UNITED STATES PATENT AND TRADEMARK OFFICE
CERTIFICATE OF CORRECTION

PATENT NO. : 7,001,029 B1  Page 1 of 1
DATED : February 21, 2006
INVENTOR(S) : Ida Famiglietti Lagana It is certified that error appears in the above-identified patent and that said Letters Patent is hereby corrected as shown below:

<u>Column 6,</u>
Line 15, insert -- mirror -- after "rearview".

Signed and Sealed this

Ninth Day of May, 2006

JON W. DUDAS
*Director of the United States Patent and Trademark Office*